United States Patent
Gottin et al.

(10) Patent No.: US 12,487,599 B2
(45) Date of Patent: Dec. 2, 2025

(54) EFFICIENT EVENT-DRIVEN OBJECT DETECTION AT THE FORKLIFTS AT THE EDGE IN WAREHOUSE ENVIRONMENTS

(71) Applicant: Dell Products L.P., Round Rock, TX (US)

(72) Inventors: Vinicius Michel Gottin, Rio de Janeiro (BR); Pablo Nascimento da Silva, Niteroi (BR); Paulo Abelha Ferreira, Rio de Janeiro (BR)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/656,351

(22) Filed: Mar. 24, 2022

(65) Prior Publication Data

US 2023/0305564 A1 Sep. 28, 2023

(51) Int. Cl.
*G05D 1/223* (2024.01)
*G05D 1/00* (2006.01)

(52) U.S. Cl.
CPC ......... *G05D 1/0214* (2013.01); *G05D 1/0027* (2013.01); *G05D 1/0094* (2013.01); *G05D 1/0223* (2013.01)

(58) Field of Classification Search
None
See application file for complete search history.

(56) References Cited

U.S. PATENT DOCUMENTS

| | | | |
|---|---|---|---|
| 6,393,362 B1 | 5/2002 | Burns | |
| 8,169,335 B2 | 5/2012 | Frederick et al. | |
| 9,547,969 B2 | 1/2017 | Beggs et al. | |
| 9,576,480 B1 | 2/2017 | Shoshan | |
| 9,671,777 B1 | 6/2017 | Aichele et al. | |
| 9,674,498 B1* | 6/2017 | Mukherjee | H04N 13/00 |
| 9,764,472 B1 | 9/2017 | Ebrahimi et al. | |
| 10,525,882 B2* | 1/2020 | Bernstein | G08G 1/165 |
| 10,661,795 B1* | 5/2020 | Li | G08G 1/166 |
| 10,885,775 B2* | 1/2021 | Herson | G08G 1/0133 |
| 11,086,328 B2 | 8/2021 | Keivan et al. | |
| 11,165,954 B1 | 11/2021 | Beach et al. | |
| 11,232,294 B1 | 1/2022 | Banerjee et al. | |

(Continued)

FOREIGN PATENT DOCUMENTS

| | | | |
|---|---|---|---|
| CN | 106651884 B | * | 10/2019 |
| CN | 112613586 A | | 4/2021 |

(Continued)

OTHER PUBLICATIONS

Liu et al, "T-C3D: Temporal Convolutional 3D Network for Real-Time Action Recognition" AAAI, 2018, (Year: 2018).*

(Continued)

*Primary Examiner* — Redhwan K Mawari
*Assistant Examiner* — Kai Wang
(74) *Attorney, Agent, or Firm* — Workman Nydegger

(57) ABSTRACT

An event driven detection model is disclosed. A model operates at a node to identify relevant video data from video streams generated by cameras. Video data that is not relevant is discarded. An objectness score is generated for the relevant video data. The objectness score and position data from position sensors is used to infer an event. When an event is inferred by the model, a decision may be made and performed.

20 Claims, 14 Drawing Sheets

(56) References Cited

U.S. PATENT DOCUMENTS

| | | | |
|---|---|---|---|
| 11,577,741 | B1 | 2/2023 | Reschka et al. |
| 12,012,318 | B2 | 6/2024 | Gottin et al. |
| 12,093,815 | B2 | 9/2024 | Otsuki et al. |
| 12,094,451 | B1 | 9/2024 | Zhang et al. |
| 2009/0109049 | A1 | 4/2009 | Frederick et al. |
| 2010/0208064 | A1* | 8/2010 | Liu .................. H04N 21/44008 348/143 |
| 2010/0228427 | A1 | 9/2010 | Anderson et al. |
| 2011/0010023 | A1 | 1/2011 | Kunzig et al. |
| 2011/0093134 | A1 | 4/2011 | Emanuel et al. |
| 2011/0279261 | A1* | 11/2011 | Gauger ................ B66F 9/0755 340/669 |
| 2012/0025964 | A1 | 2/2012 | Beggs et al. |
| 2012/0083947 | A1 | 4/2012 | Anderson et al. |
| 2014/0191869 | A1 | 7/2014 | Frederick |
| 2014/0324336 | A1 | 10/2014 | Prokhorov et al. |
| 2015/0145661 | A1* | 5/2015 | Beggs ................... B60Q 9/008 340/435 |
| 2016/0129592 | A1 | 5/2016 | Saboo et al. |
| 2016/0180713 | A1* | 6/2016 | Bernhardt ............ B66F 17/003 701/70 |
| 2017/0297569 | A1 | 10/2017 | Nilsson et al. |
| 2017/0337813 | A1 | 11/2017 | Taylor |
| 2017/0337820 | A1 | 11/2017 | Glatfelter et al. |
| 2017/0356596 | A1 | 12/2017 | Frederick |
| 2018/0203727 | A1* | 7/2018 | Jarvis ....................... G06F 8/70 |
| 2019/0043351 | A1 | 2/2019 | Yang et al. |
| 2019/0138895 | A1 | 5/2019 | Jin et al. |
| 2019/0268722 | A1 | 8/2019 | Elswick et al. |
| 2019/0317219 | A1 | 10/2019 | Smith et al. |
| 2020/0225673 | A1 | 7/2020 | Ebrahimi et al. |
| 2020/0257310 | A1 | 8/2020 | Du et al. |
| 2020/0311559 | A1 | 10/2020 | Chattopadhyay et al. |
| 2020/0334837 | A1 | 10/2020 | Feigl et al. |
| 2020/0380406 | A1 | 12/2020 | Dickens et al. |
| 2020/0410281 | A1 | 12/2020 | Goel et al. |
| 2021/0089762 | A1 | 3/2021 | Rahimi et al. |
| 2021/0192810 | A1 | 6/2021 | Paysan et al. |
| 2021/0273858 | A1* | 9/2021 | Radovanovic ......... G06Q 50/06 |
| 2021/0295154 | A1 | 9/2021 | Groh |
| 2022/0066456 | A1 | 3/2022 | Ebrahimi et al. |
| 2022/0089372 | A1 | 3/2022 | Phillips et al. |
| 2022/0138943 | A1 | 5/2022 | Zhu et al. |
| 2022/0231919 | A1 | 7/2022 | Pandey et al. |
| 2022/0253647 | A1 | 8/2022 | Perkins |
| 2022/0330896 | A1 | 10/2022 | Min et al. |
| 2022/0394531 | A1* | 12/2022 | Jeong ....................... H04L 41/12 |
| 2022/0409991 | A1* | 12/2022 | Ohashi .................... A63F 13/26 |
| 2023/0030039 | A1* | 2/2023 | Drapeko ................... G06F 8/70 |
| 2023/0068523 | A1 | 3/2023 | Santra et al. |
| 2023/0159027 | A1 | 5/2023 | Pronovost |
| 2023/0177951 | A1 | 6/2023 | Mubarek et al. |
| 2023/0221942 | A1 | 7/2023 | Zhang et al. |
| 2023/0409881 | A1 | 12/2023 | Heitzmann et al. |
| 2024/0190473 | A1 | 6/2024 | Akella et al. |
| 2024/0214314 | A1 | 6/2024 | Zhao et al. |
| 2024/0278797 | A1 | 8/2024 | Agrawal et al. |
| 2025/0077942 | A1 | 3/2025 | Chaabane et al. |

FOREIGN PATENT DOCUMENTS

| | | |
|---|---|---|
| CN | 112945227 A | 6/2021 |
| CN | 114527676 A | 5/2022 |
| DE | 102021200452 A1 | 7/2022 |
| WO | 2011/092229 A1 | 8/2011 |
| WO | 2022/156947 A1 | 7/2022 |
| WO | 2023/287176 A1 | 1/2023 |

OTHER PUBLICATIONS

W.-H. Chung, G. Chakraborty, R.-C. Chen and C. Bornand, "Object Dynamics from Video Clips using YOLO Framework," 2019 IEEE 10th International Conference on Awareness Science and Technology (iCAST), Morioka, Japan, Oct. 23-25, 2019, pp. 1-6, (Year: 2019).*

"T-C3D: Temporal Convolutional 3D Network for Real-Time Action Recognition" AAAI, 2018, to Liu et al (Liu), (Year: 2018).*

"How Accurate Are RFID Systems?"—RFID Journal; (Accessed Oct. 28, 2022).

B. Kim, C. Kang, J. Kim, S. Lee, C. Chung and J. Choi, "Probabilistic vehicle trajectory prediction over occupancy grid map via recurrent neural network," in 20th International Conference on Intelligent Transportation Systems (ITSC), 2017.

C. Hegde, S. Dash and P. Agarwal, "Vehicle Trajectory Prediction using GAN," in Fourth International Conference on I-SMAC (IoT in Social, Mobile, Analytics and Cloud)(I-SMAC) , 2020.

Gal, Yarin, and Zoubin Ghahramani. "Dropout as a Bayesian approximation: Representing model uncertainty in deep learning." international conference on machine learning. PMLR, 2016.

Inpixon—Bluetooth Location Tracking & Positioning, https://www.inpixon.com/technology/standards/bluetooth-low-energy (Accessed Oct. 28, 2022).

Link Labs—"The Complete Active RFID Overview", Mar. 14, 2018.

S. Srikanth, J. Ansari, R. Ram, S. Sharma, J. Murthy and K. Krishna, "Infer: Intermediate representations for future prediction," in IEEE/RSJ International Conference on Intelligent Robots and Systems (IROS) , 2019.

Wikipedia, Autoencoder, https://en.wikipedia.org/wiki/Autoencoder, Jan. 10, 2021.

B. Alexe, T. Deselaers and V. Ferrari, "Measuring the objectness of image windows," IEEE transactions on pattern analysis and machine intelligence, vol. 11, No. 34, pp. 2189-2202, 2021.

B. McMahan, E. Moore, D. Ramage, S. Hampson and B. y Arcas, "Communication-efficient learning of deep networks from decentralized data.," In Artificial Intelligence and Statistics, pp. 1273-1282, 2017.

C. L. Zitnick and P. Dollar, "Edge boxes: Locating object proposals from edges.," European conference on computer vision, pp. 391-405, 2014.

J. Bernstein, Y. X. Wang, K. Azizzadenesheli and A. Anandkumar, "signSGD: compressed optimisation for non-convex problems," CoRR, vol. abs/1802.04434, 2021.

K. M. Rashid and A. H. Behzadan, "Risk Behavior-Based Trajectory Prediction for Construction Site Safety Monitoring," Journal of construction engineering and management, 2018.

Li, "Federated learning: Challenges, methods, and future directions," IEEE Signal Processing Magazine, vol. 37, No. 3, pp. 50-60, 2020.

Oza, P., & Patel, V. M. (2019). "C2ae: Class Conditioned Auto-Encoder for Open-set Recognition." In Proceedings of the IEEE/CVF Conference on Computer Vision and Pattern Recognition (pp. 2307-2316).

P. Tang, X. Wang, A. Wang, Y. Yan, W. Liu, J. Huang and A. Yuille, "Weakly supervised region proposal network and object detection," Proceedings of the European conference on computer vision (ECCV), 2018.

U.S. Appl. No. 17/585,055, tilled, Edge-Enabled Trajectory Map Generation, filed Jan. 26, 2022.

U.S. Appl. No. 17/663,423, tilled, "Unsupervised Learning For Real-Time Detection of Far Edge Mobile Device Trajectories", filed May 14, 2022.

He, Chaoyang, et al. "Federated Learning for Internet of Things" IEEE Internet of Things Magazine 5.1 (2021): 24-29. (Year: 2021).

* cited by examiner

EFFICIENT EVENT-DRIVEN OBJECT DETECTION AT THE FORKLIFTS AT THE EDGE IN WAREHOUSE ENVIRONMENTS

RELATED APPLICATIONS

This application is related to U.S. Ser. No. 17/647,758 filed Jan. 12, 2022, which application is incorporated by referenced in its entirety.

FIELD OF THE INVENTION

Embodiments of the present invention generally relate to logistics and event detection. More particularly, at least some embodiments of the invention relate to systems, hardware, software, computer-readable media, and methods for monitoring objects in an environment to facilitate logistics operations and for supporting decision making tasks in environments that includes multiple objects.

BACKGROUND

Logistics in environments such as a warehouse can be difficult to monitor and manage at least because many different objects may exist and/or operate simultaneously. Many of the objects in the warehouse, for example, are mobile in nature while other objects may be stationary or fixed. As a result, care should be exercised to help ensure that accidents or other problems do not occur. This can be difficult as many of the objects operate concurrently, and their relative positions may not be known to each other.

In a warehouse, for example, multiple mobile devices or machines may be operating at the same time. Examples of these mobile devices includes forklifts. The forklift operators need to look out for each other in addition to taking care around other objects or hazards such as shelving or storage space, pillars, docks, pallets, and the like. Even if these forklift operators are able to communicate with each other, it is difficult to coordinate the movement of multiple forklifts and ensure that undesirable interactions do not occur. Operations to ensure safety in an environment can be compromised by communication delays and communication overhead. Effectively performing logistics operations is complex and involves many unknowns.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
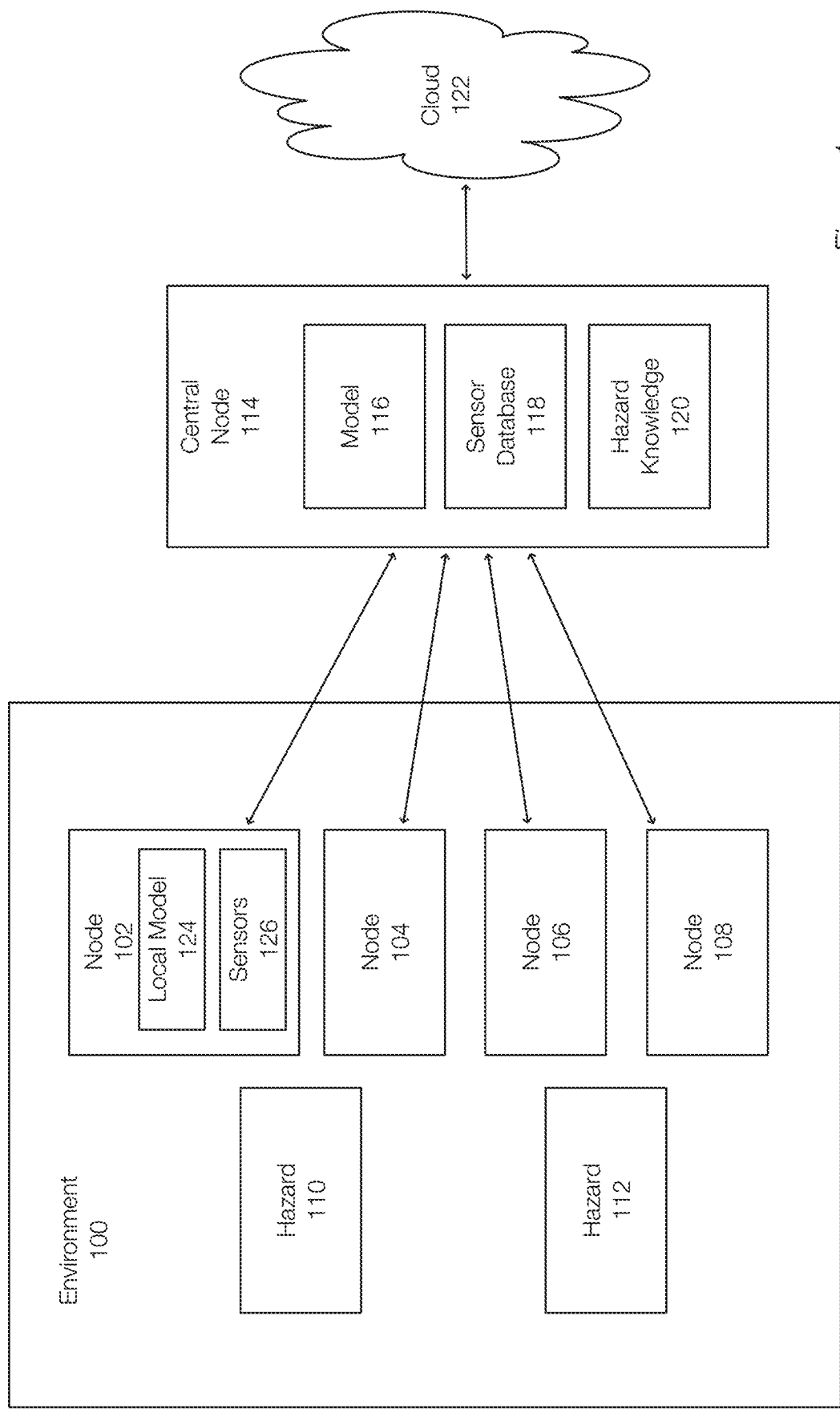
FIG. 1 discloses aspects of models, including machine learning models, that facilitate logistics operations in environments.

Embodiments of the present invention generally relate to logistics and event detection. More particularly, at least some embodiments of the invention relate to systems, hardware, software, computer-readable media, and methods for supporting decision making tasks in complex environments.

Embodiments of the invention can be applied or implemented to provide or perform logistics operations in different types of environments. Generally, an environment may include objects, including mobile objects, movable objects, and/or stationary or static objects. These objects may include or be associated with sensors of varying types that generate data.

The data generated by the sensors can be used to perform logistics operations, which include by way of example and not limitation, event detection operations, tracking operations, trajectory prediction operations, alerting operations, positioning operations, object management operations, object monitoring operations, automation operations, safety operations, hazard detection operations, hazard avoidance operations, auditing operations, management operations, or the like or combination thereof. More specifically, embodiments of the invention perform logistics, including decision making operations, based on sensor data generated at edge nodes in an edge environment.

In one example, the ability to detect an event may facilitate automated decision making in an environment. For example, if position data indicates that two forklifts are on a collision course, embodiments of the invention may generate an alarm. If video data indicates that a forklift is too close to a hazard (a wall, a station) or may collide with a person, a decision can be made and implemented in an automated manner. Because some types of data, such as video data, is more costly to process, transmit, and store, embodiments of the invention include the ability to selectively process, transmit, and store video data.

Embodiments of the invention are discussed in the context of an environment such as a warehouse. A warehouse may be associated with multiple mobile objects, which may include forklifts and people. Movable objects may include pallets or product. Stationary or static objects may include ports, docks, shelving, corridors, corners, other operational areas, or the like.

From the perspective of a particular object such as a forklift, for example, all other objects may constitute hazards. Hazards, as used herein, does not necessarily refer to dangerous objects. Thus, from the perspective of a specific forklift, hazards include other objects such as other forklifts, people, pallets, zones (e.g., defined areas), docks, corridors, corners, or the like or any combination thereof. Further, the definition of a hazard or object may also be dependent on the environment (or domain).

Embodiments of the invention are achieved, in part, by equipping the objects with hardware such as sensors, processors, memory, networking hardware, or the like. In some examples, the objects may already be equipped with this type of hardware or portions thereof. The hardware may depend on the nature of the associated object. Mobile objects, for example, may be equipped with a different set of sensors compared to sensors or devices associated with a stationary or movable object. For example, hardware such as sensors, processors, memory, or the like may be integrated with a forklift. A pallet, in contrast, may only have an RFID (Radio Frequency Identification) tag.

The hardware (and/or any software thereon) may be referred to as a node. However, reference to a node may also constitute a reference to the object associated with the node and on which the node is attached. Reference to an object may refer to the object and/or the node.

From the perspective of a particular node, other nodes (and their associated objects) in the environment may constitute hazards. Nodes in the environment may be referred to as edge nodes as they operate on the edge of a network and may communicate with a central node operating at a near-edge infrastructure. The central node is typically more computationally powerful than the edge nodes.

In one example, a node may be associated with sensors including position sensors, inertial sensors, and camera(s). Cameras (and/or other sensors) allow a node to perform event detection operations. For example, the node may detect an object (e.g., a corner) in frames generated by a camera. This may be combined with positional data. The combination may indicate that the corner is a blind corner or that the object may not be able to turn the corner successfully. The ability to detect objects in images can facilitate auditing (e.g., the ability to identify what objects or persons were involved in an accident stemming from a dangerous cornering event or other event).

However, cameras can generate video streams that are difficult to manage due in part, to the amount of data generated. Cameras are often viewed as high-cost sensors with regard to processing, transmission (communication requirements) and storage. Embodiments of the invention focus on obtaining the relevant data (e.g., specific video frames) such that less relevant frames can be ignored. This allows some of the video data to be discarded and thus avoids the costs of processing, transmitting, and/or storing large amounts of video data. The relevant data can be used for training a model. This may allow cameras or similar sensors to be used in conjunction with or in replacement of rule-based and/or inertial or position-based models.

Embodiments of the invention support decision-making tasks in edge environments. In one example, object detection (based on video data) can enrich the event detection task and may also be used for auditing and management purposes. Video data, for example, may be used to identify the objects involved in an incident.

Embodiments of the invention manage and orchestrate the selection of video frames to avoid the computational costs of processing excessive amounts of video data, storing excessive amounts of video data, and transmitting excessive amounts of video data.

In some embodiments, the edge nodes may each have sufficient hardware (e.g., processor, memory, networking hardware) to process data generated by the node's sensors and/or information about other nodes that is broadcast by a central node. The central node is able to perform more complex and thorough processing of the data generated at or by nodes in the edge environment.

As previously stated, each node in the environment may be associated with one or more sensors. A forklift, for example, may be associated with a node that includes sensors positioned at various locations on the forklift. The sensors may be placed on the forks or arm (e.g., at the distal ends) and/or on the body of the forklift. This allows the position of the forklift (and of the arms) to be determined. Other information such as height, width, and length of the forklift may also be known and taken into account. However, the position data may be combined to form a single position and/or orientation of the forklift.

The node associated with a forklift may include sensors such as cameras. Other sensors such as temperature sensors, velocity sensors, motion sensors, acceleration/deceleration sensors, or the like or combination thereof may also be provided. In general, the sensors associated with a forklift may generate data that can be used to detect objects, detect events, record events, determine a position/orientation of the forklift in the warehouse (or its vicinity), velocity, direction of travel, or the like. The sensor data may be processed at the node and/or at the central node to detect/identify objects and events, determine a position of the forklift and/or predict a trajectory of the forklift and/or perform localized decision making operations.

Movable objects such as pallets or products may be associated with a node that includes RFID tags such that the positions of objects such as pallets can be read and tracked in the environment. Personal cellular phones may be used to track the positions of people in the environment. The locations of other objects such as docks, corridors, or the like does not change and is known or programmed into the edge nodes and the central node that are performing logistics operations.

In addition to including cameras on nodes such as forklifts, cameras may be placed in various locations in the environment (e.g., attached to stationary objects, movable objects). Video data generated by cameras can be processed to detect objects and/or events in the environment.

The warehouse is an example of a dynamic edge environment in which quickness and accuracy in decision making (including safety related decisions) is useful. Embodiments of the invention may detect objects, enable real-time object aware event detection, or the like. Data originating at the objects is collected from the objects (or from the associated node) and processed using computing resources of the node. Data from all objects may be received by a central node (e.g., container(s), physical machine(s), server(s), virtual machine(s)) operating at a near-edge infrastructure (or the cloud) and processed using resources of the near-edge infrastructure (or cloud).

FIG. 1 discloses aspects of an environment in which embodiments of the invention may be deployed or implemented. FIG. 1 illustrates a logistics system that includes edge nodes 102, 104, 106, and 108 and a central node 114. The edge nodes and the central node may coordinate to perform logistics operations.

The environment 100 may be a warehouse or other environment. The nodes 102, 104, 106, and 108 operate or exist in the environment 100. In the context of a warehouse environment, the nodes 102, 104, 106, and 108 may have different types and correspond to or are associated with objects related to the warehouse environment. In the present example the nodes 102 and 104 may correspond to or are associated with forklifts. The nodes 106 and 108 may correspond to or be associated with other objects (e.g., machinery, hazards, persons, corridors, corners, shelving) that may be mobile, movable, or stationary and which are hazards from the perspective of the forklifts.

Each of the nodes 102, 104, 106, and 108 may be associated with or include sensors. The sensors may depend on the associated object. Example sensors include a camera, position sensors, and inertial sensors. The nodes 102, 104, 106, and 108 may include compute resources such as a processor, memory, networking hardware, or the like.

A central node 114 (e.g., implemented in a near edge infrastructure) may be configured to communicate with each of the nodes 102, 104, 106, and 108. The communication may be performed through hardware such as a router or gateway or other devices. Depending on the sensor and the configuration of the node, the communication may be one way. For example, a pallet associated with an RFID tag may simply be read to determine the pallet's position. A forklift, in contrast, may also receive information from the central node 114 and use the information to perform logistics operations.

For example, the node 102, which may be attached to or an integral part of an object such as forklift, may be configured with sensors of various types and with sufficient hardware (e.g., processor, memory) to implement and run a local model 124 using the data collected by the sensors of the node 102. Other forklifts in the environment may also include or be associated with a local model.

For example, if the node 102 corresponds to or is associated with a forklift, the sensors of the node 102 may be arranged on the forklift in different manners. For example, position sensors may be deployed on the forklift's arms (forks or tines). By placing sensors on the arms, the positions of the arms relative to the forklift body and in the environment 100 can be determined. Alternatively, the node 102 may be associated with a single position sensor. In one example, the sensors of the node 102 allow a center position of the node to be determined. The position sensors generate positional data that determine a position of the forklift in the environment 100. Positional data can also be collected as time series data, which can be analyzed to determine a position of the forklift, a velocity of the forklift, a trajectory or direction or travel or the like. Over time, the movements of the forklift can be learned such that the anticipated trajectory, which may not be a straight line, can be determined or predicted. The camera sensors may generate video data that can be analyzed to detect objects, which can be associated with events and/or other sensor data.

In one example, a map of the environment is generated and may be stored at the central node and/or at the edge nodes. The logistics system is configured to map the position data received from the nodes into the map of the environment. This allows the positions of all nodes (objects) to be determined with respect to each other and with respect to the environment 100.

The central node 114 may include a near edge model 116, a sensor database 118, and hazard knowledge 120. The sensor database 118 may be configured to store sensor data received from the nodes 102, 104, 106, and 108 and/or other nodes in the environment 100. Because the nodes are associated with or integrated with objects, the sensor database 118 corresponds to information about the objects. More specifically, the sensor database 118 may be used to store the information generated by or at the forklifts. The sensor database 118 may include a database for different sensor types. Thus, the sensor database 118 may include a position data database, a video data database, an event database, or the like.

The hazard knowledge 120 includes information relative to the hazards, represented by the hazards 110 and 112, in the environment 100. The hazards 110 and 112 represent relevant aspects of the operational area, which may include movable and/or static objects. In one example, a defined area may also constitute a hazard. By way of example only, the local model 124 may generate an alarm based on the data from the sensors 126. The model 116 may also be configured to generate an alarm based on the data from the sensors 126 and or data from sensors associated with other nodes in the environment.

In one example, the local model 124 is trained at the central node 114 and/or the cloud 122 and deployed to the relevant nodes (e.g., mobile objects such as forklifts). The local model 124 is trained using available (historical) video, positioning and/or inertial measurement data. Different models may be used for different data types. After training, the local model 124 may be deployed to the nodes. In one example, the model 116 and the local model 124 are the same. One difference is that the local model 124 may operate using locally generated data as input while the model 116 may use data generated from multiple nodes in the environment 100 as input.

Figure 2:
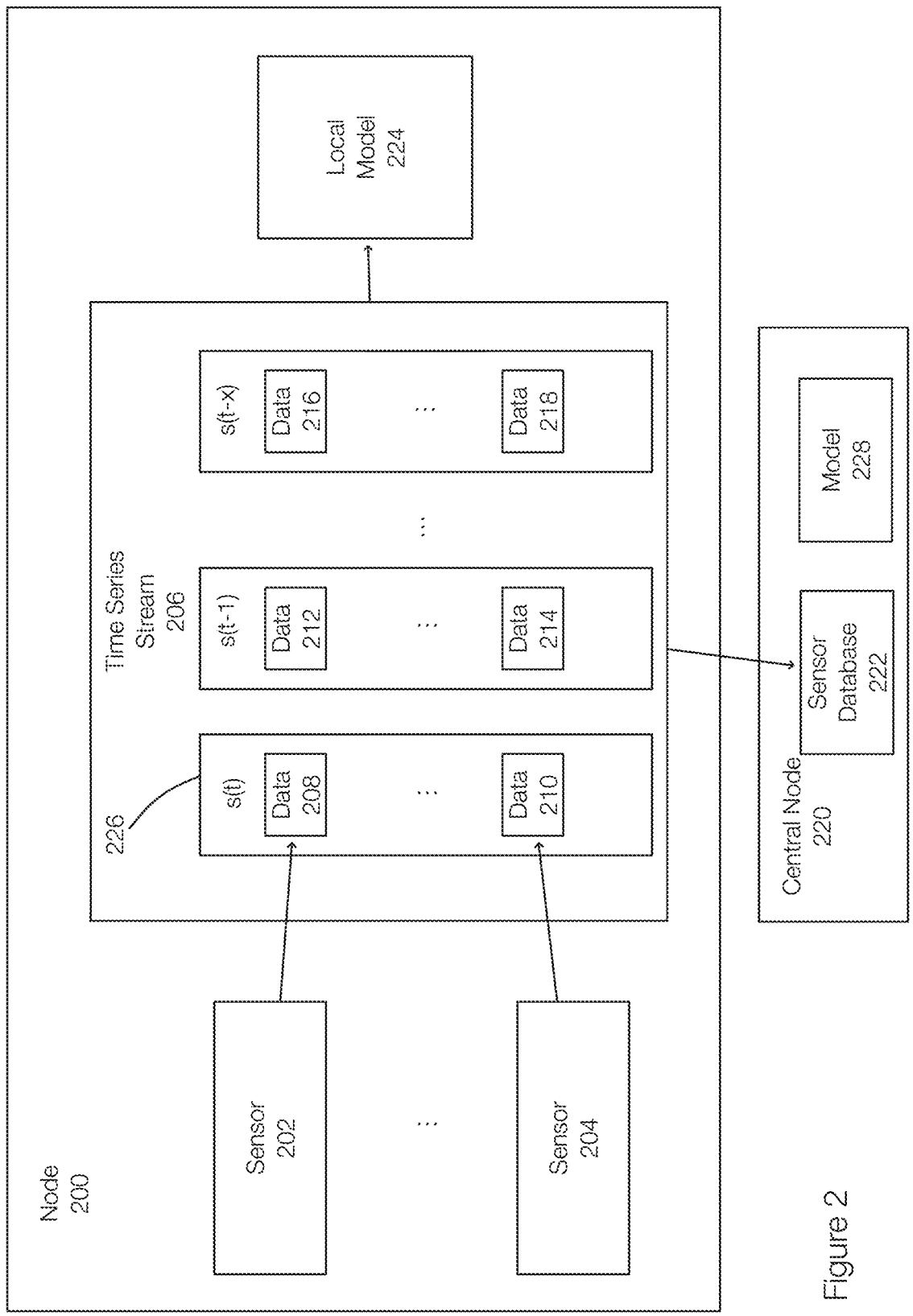
FIG. 2 discloses aspects of a local model configured to generate inferences based on data generated by sensors at nodes in an edge environment.

FIG. 2 discloses aspects of a node associated with or integrated with an object and configured to operate in an environment and perform logistics operations. The node 200, an example of the node 102, may include sensors, represented by sensors 202 and 204. The node 200 collects, over time, multiple readings from the sensors 202 and 204 that constitute a time series stream 206. For example, the stream 206 includes readings at different times and the data collected at a particular time may be referred to as a collection. Thus, the time series stream 206 may include multiple collections such as the collection 226.

The data 208 and 210 in the collection 226 were collected at time s(t), the data 212 and 214 were collected at time s(t−1), and the data 216 and 218 were collected at time s(t−x). Each of the nodes that includes sensors may generate a similar sensor data stream. Data generated from the sensors 202 and 204 may be collected periodically, whenever a change in a sensor's data is detected (e.g., acceleration or deceleration is detected), or the like or combination thereof. Data from the sensors 202 and 204 may be collected at different times. Further, the sensors 202 and 204 may be grouped by type (e.g., position sensors, acceleration sensors, temperate sensors) and each data from each type or from designated groups of sensors may be collected separately. IN one example, there may be a time series stream for positional data, a time series stream for video data, or the like.

Further, time series streams may be coordinated in time. A collection of video data may correspond to a collection of positional data.

The data collected from the sensors 202 and 204 is associated with or includes position data that can be mapped into coordinates of the environment 100. Thus, for the collection of data associated with time s(t), a position p(t) is associated with the collection 226 of data. When collecting data from the sensors 202 and 204, the collection of data is typically correlated to a position in the environment. In addition to position data, sensors may also provide inertial measurements of acceleration and deceleration as well as, for objects such as a forklift, mast position, load weight, or the like. The data collected from an object may depend on the object.

The time series stream 206 may be transmitted to a central node 220, an example of the central node 114, and stored in a sensor database 222 of or associated with a central node. Thus, the time series stream 206 is available for use by the local model 224 to determine a position or trajectory or detect an event or an object. The time series data from all nodes is available to the near edge model 228, which may perform the same or similar function as the local model 224 but may generate inferences based on data from multiple nodes.

The time series stream 206 may be collected periodically at the central node 220. This allows the central node 220 to store, in addition to hazard knowledge 120, sensor data 222 from each of the nodes. Stated differently, the central node 220 may store position data related to both dynamic and static nodes.

Figure 3A:
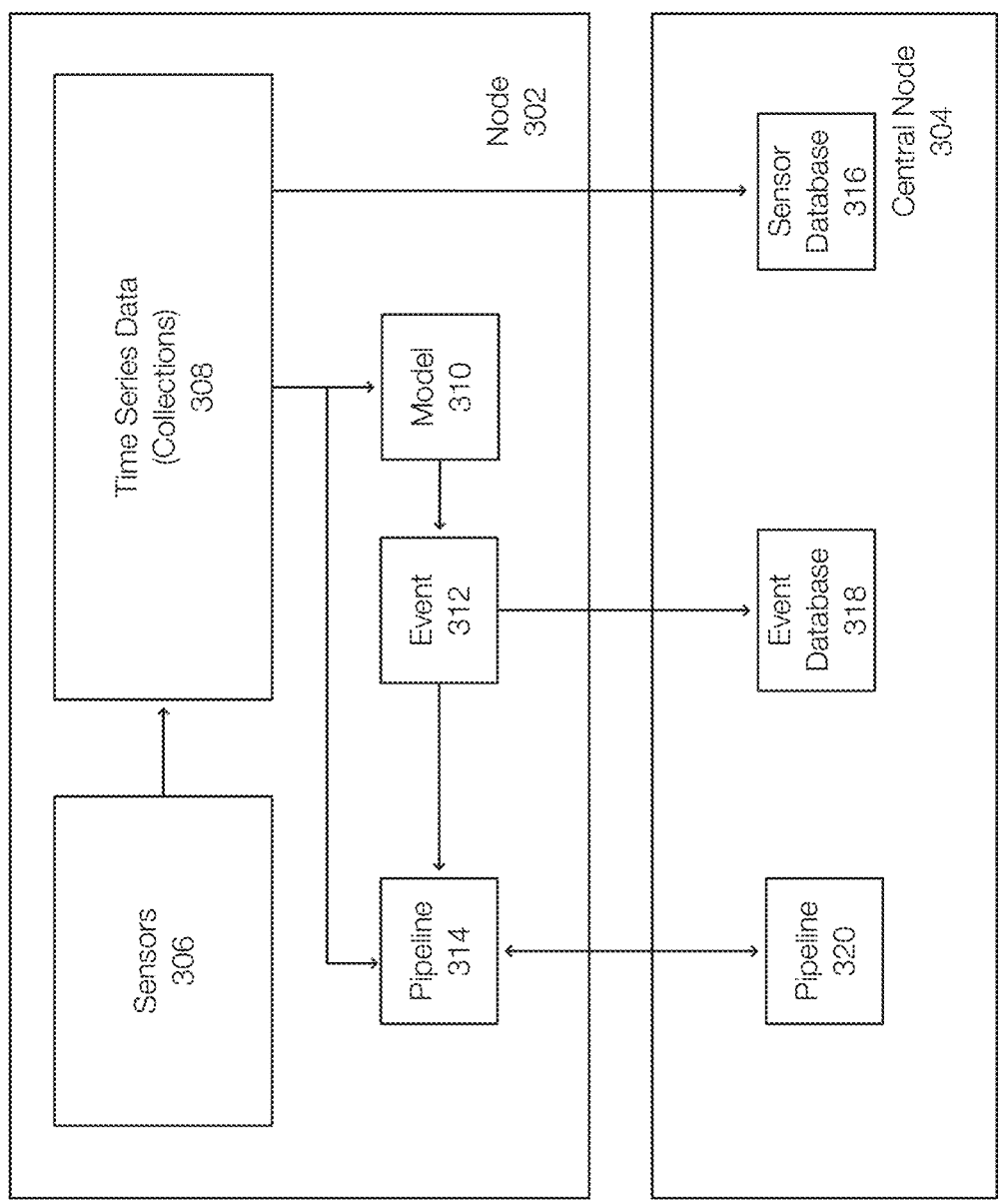
FIG. 3A discloses aspects of event detection models operating in an edge environment and in communication with a centralized or near-edge node or system.
Figure 3B:
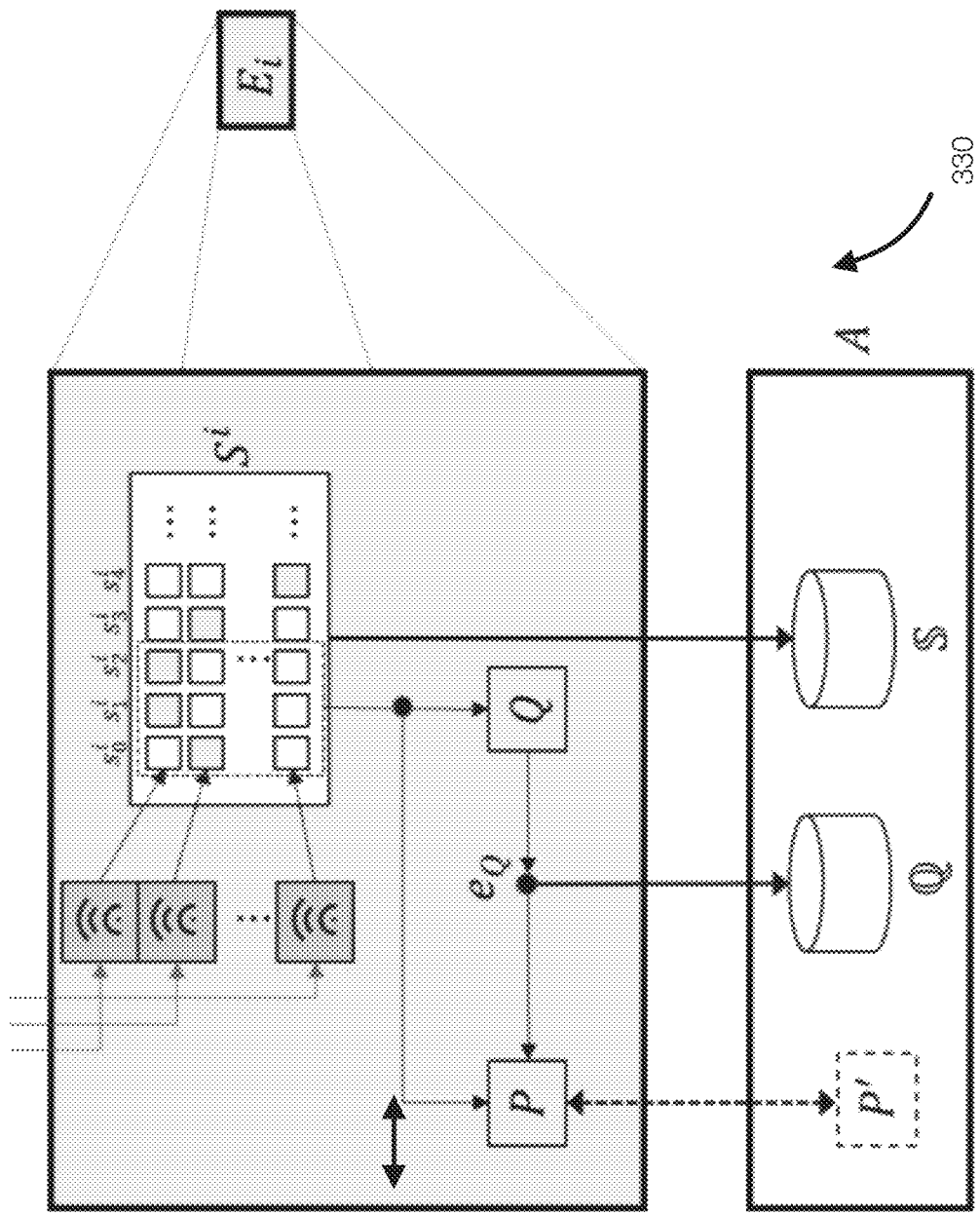
FIG. 3B discloses a representation of FIG. 3A that includes mathematical representations of models, data, and data sets.

FIG. 3A discloses aspects of event-driven object detection in an environment. FIG. 3B includes a mathematical representation 330 for a central or edge node A and a node $E_i$, which correspond, respectively, to a node 302, an example of the node 102, and an edge or central node 304, an example of the central node 114.

With reference to FIGS. 3A and 3B, the sensors 306 generate data that is captured as time series data 308. The time series data 308 includes collections as previously described. The time series data 308 may be delivered to the central node 304 and stored in a sensor database 316. This time series data 308 may be transmitted over a network connection.

A model 310 (Q), which may have been previously trained, is deployed to the node 302. The model 310, by processing one or more collections of the time series data 308, may detect an event 312 ($e_Q$). The event 312 is used to inform the pipeline 314 (P). The pipeline 314 may be configured to make decisions based on the event 312 and/or one or more collections from the time series data 308.

For example, the pipeline may be domain dependent and may include additional processes, models, or the like. The pipeline 314 may be configured to make decisions such as generating an alarm if the event 312 indicates that the node 302 is too close to another node or hazard. The pipeline 314 may also make changes in the parameterization of the node 302 or the like. The pipeline 3314 may also involve communications to and from the central node 304 and/or other nodes. Thus, the events 312 are communicated to the event database 318 ($\mathbb{Q}$) and the pipeline 314 may also communicate decisions to the pipeline 320 (P'), which may allow decisions to be made from a holistic view of the environment.

Figure 3C:
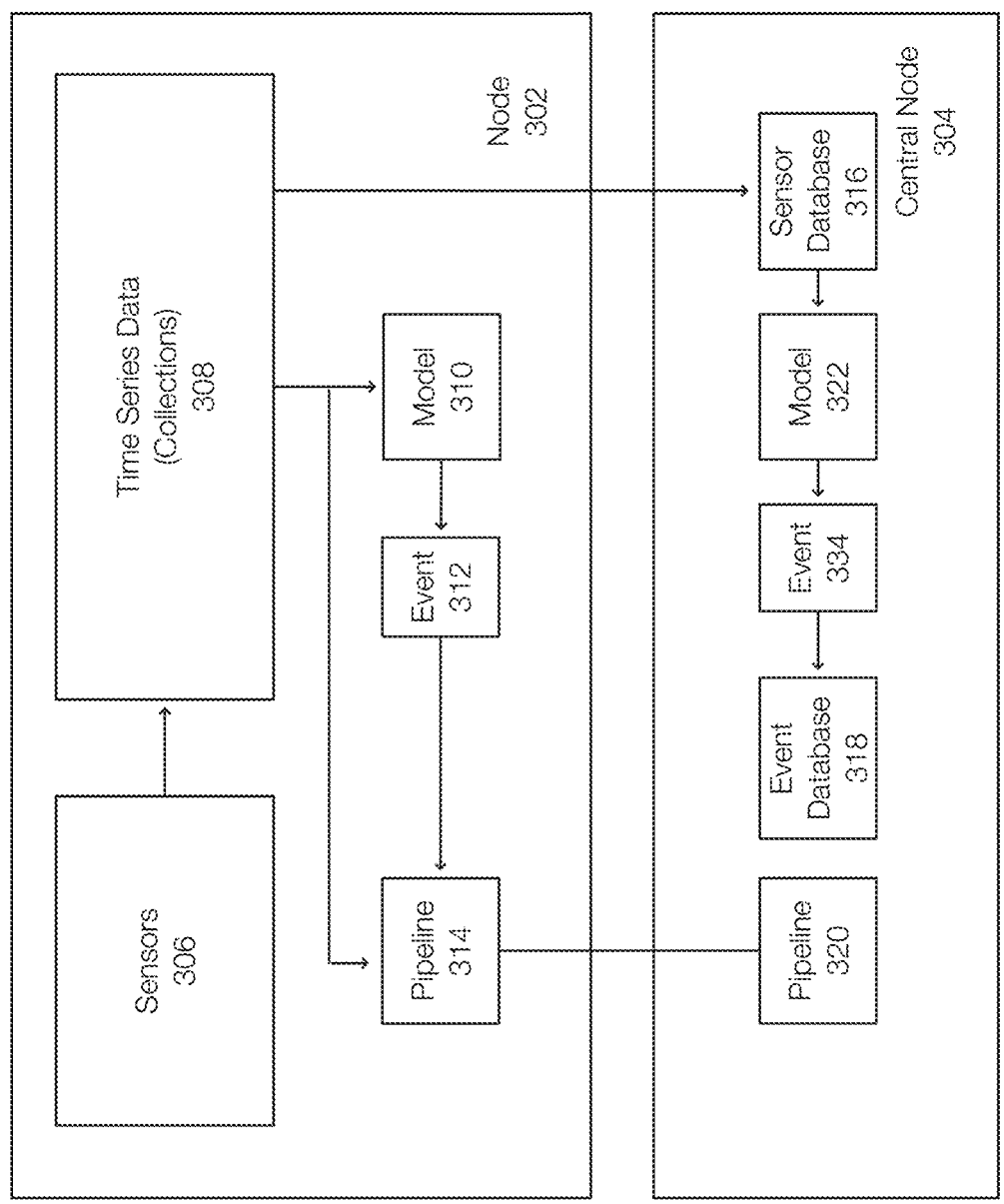
FIG. 3C discloses aspects of event-detection models operating in an edge environment and a centralized or near-edge node or system.
Figure 3D:
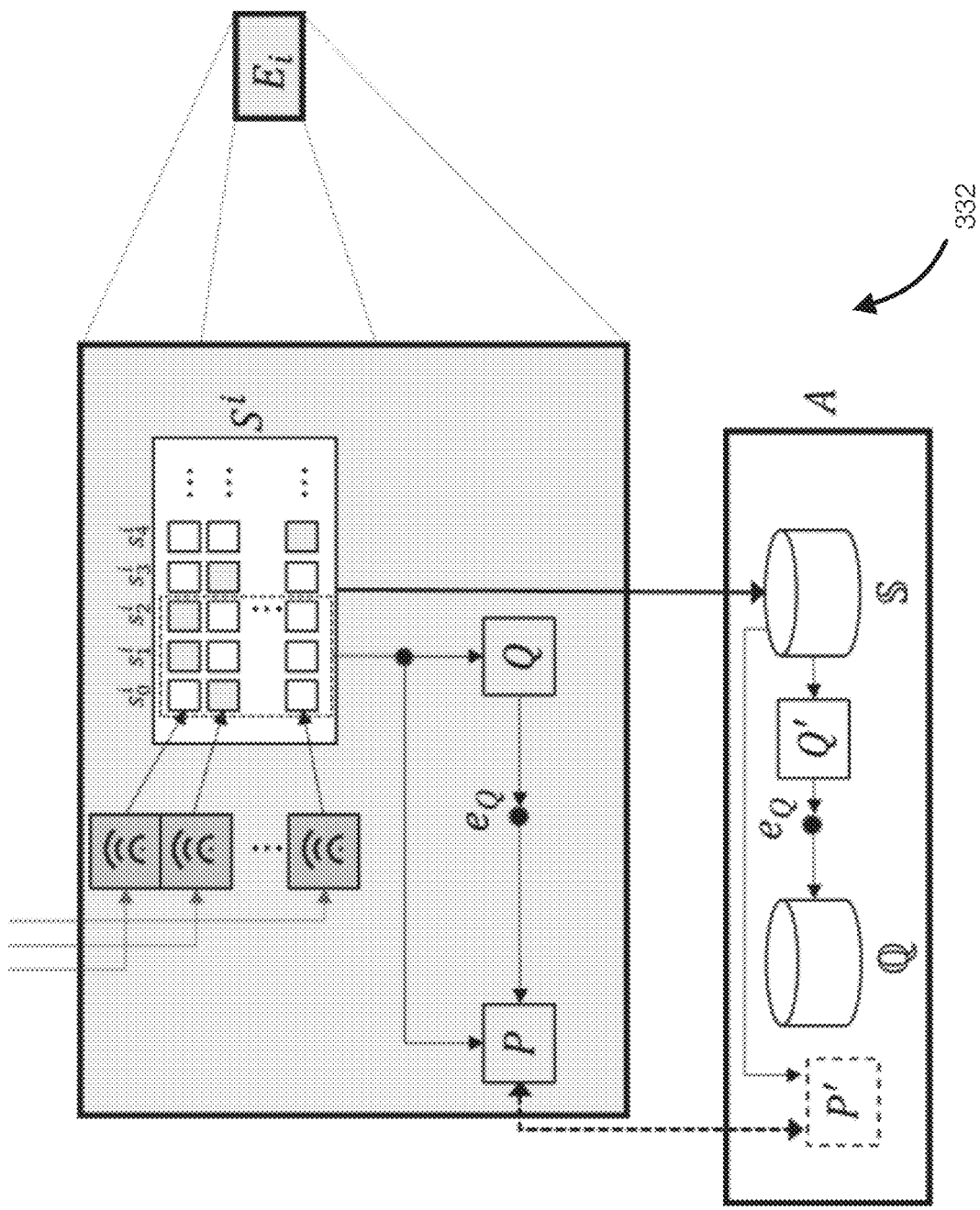
FIG. 3D discloses a representation of FIG. 3C that includes mathematical representations of models, data, and data sets.

FIG. 3C discloses another example of event-driven object detection and includes a mathematical representation 332 for the node $E_i$ and the central node A, which is illustrated in FIG. 3D. In FIG. 3C, the central node 304 may have a model 322 (Q'), which may be trained using the sensor database 316 ($\mathbb{S}$) or other data. The model 322 is similar to or identical to the model 310. The model 322 at the central node 304 may be trained with the data in the sensor database 316. In one example, the models 310 and 322 are trained with the same data.

In FIG. 3C, the event 312 may not be communicated to the event database 318. Rather, the model 322 may generate an inference (the event 334) using the model 322 and data communicated to the sensor database 316 from the nodes in the environment including the node 302. The event 334 may be stored in the event database 318. More specifically, the event detections at the node 302 are not communicated to the central node 304. Rather, the central node 304 may replicate the computation using the model 322. In one example, this is performed when the model 310 and the model 322 are deterministic and/or when there are multiple nodes associated with the central node 304, which impacts communication costs.

In the examples of FIGS. 3A and 3C, the central node 304 may accumulate a database of events in the event database 318 ($\mathbb{Q}$) in different manners.

Figure 4A:
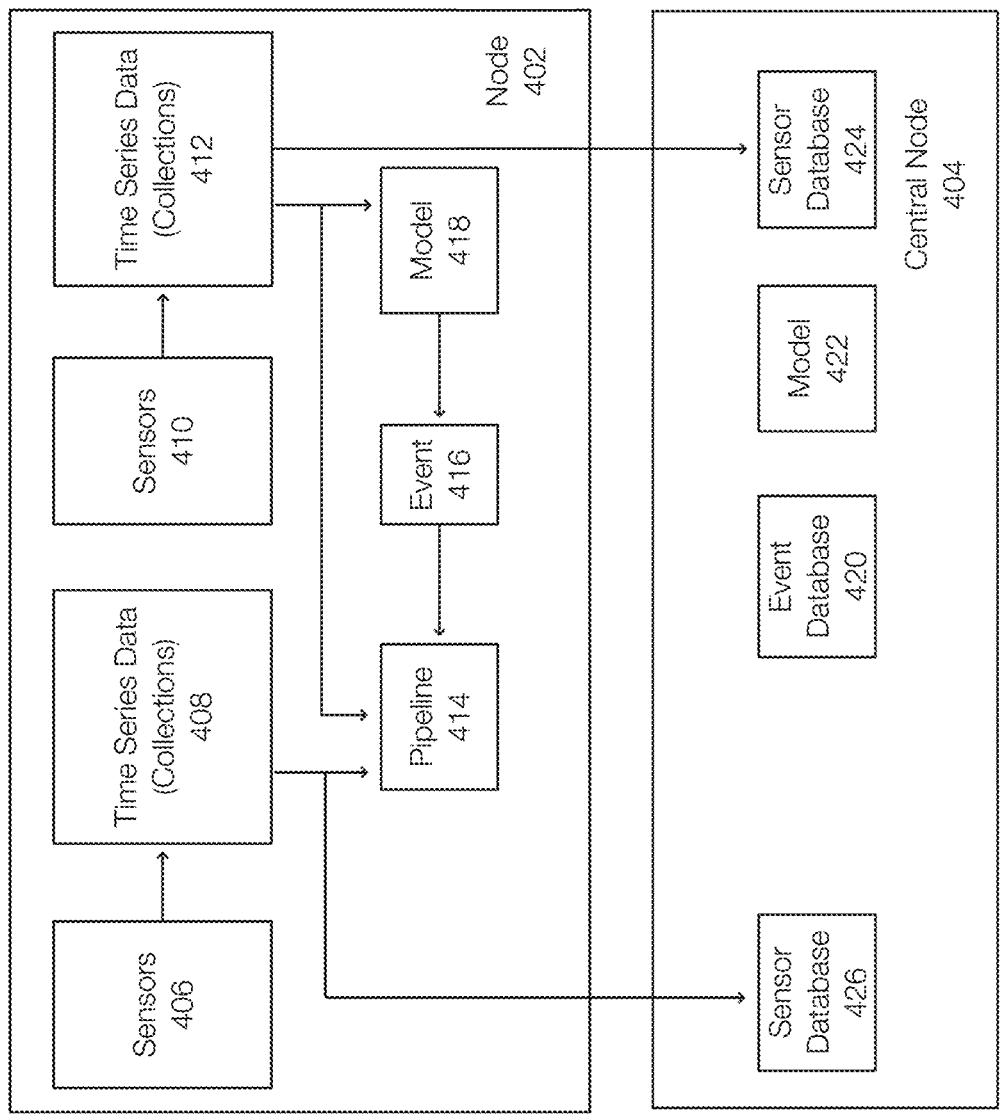
FIG. 4A discloses aspects of event-detection models that accommodate multiple data types representing data from different sensor types.
Figure 4B:
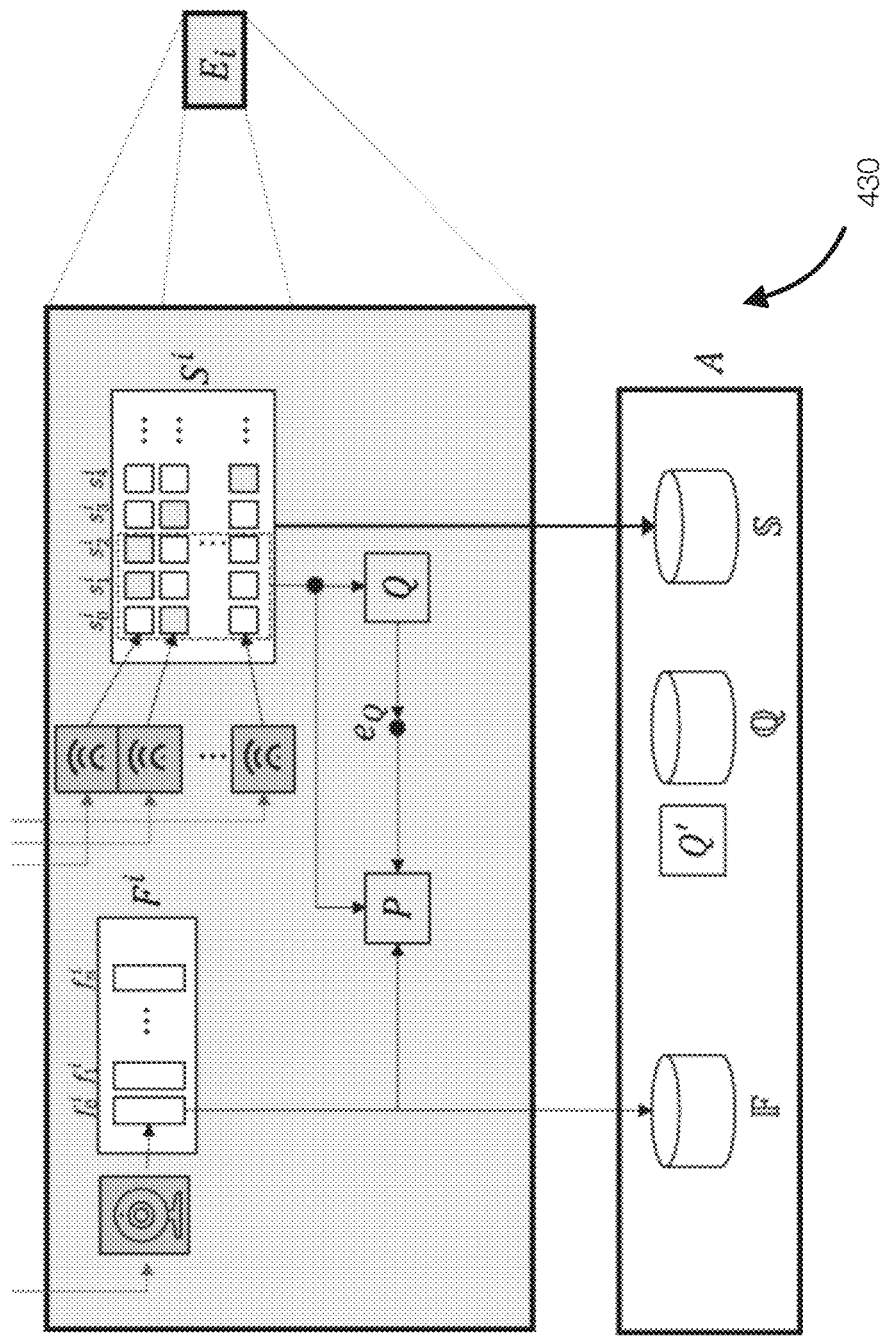
FIG. 4B discloses a representation of FIG. 4A that includes mathematical representations of models, data, and data sets.

FIG. 4A discloses aspects of detecting events in an environment. FIG. 4A illustrates a node 402, which is an example of the node 102 and a central node 404, which is an example of the node 114. FIG. 4A illustrates aspects of detecting events using different types of sensors. In this example, the sensors 410 may be positional sensors that generate time series data 412 related to a position of the node 402. As previously stated, the time series data may be represented by data $S^i$ and each collection in the time series data 412 may be represented by $s_x^i$. The sensors 406 may be cameras that generate time series data 408 and is represented by $F^i$. Each collection of sensor data may be represented by $f_x^i$. The sensors 406 may generate video streams. The collections may include sets of frames (e.g., one frame from each camera). The time series data 408 may be transmitted to the central node 404 and stored in the sensor database 426 ($\mathbb{F}$).

In the example of FIG. 4A, the pipeline 414 and the sensor database 422 receive all video frames generated by the sensors 406. In this example, the frames of video data in the time series data 408 or in one or more collections may be processed using a model to determine whether an object is present. However, this is costly from a processing and storage perspective due to the large amount of video data generated by the sensors 406 of the node 402 and of multiple other nodes that may operate in the edge environment.

Figure 4C:
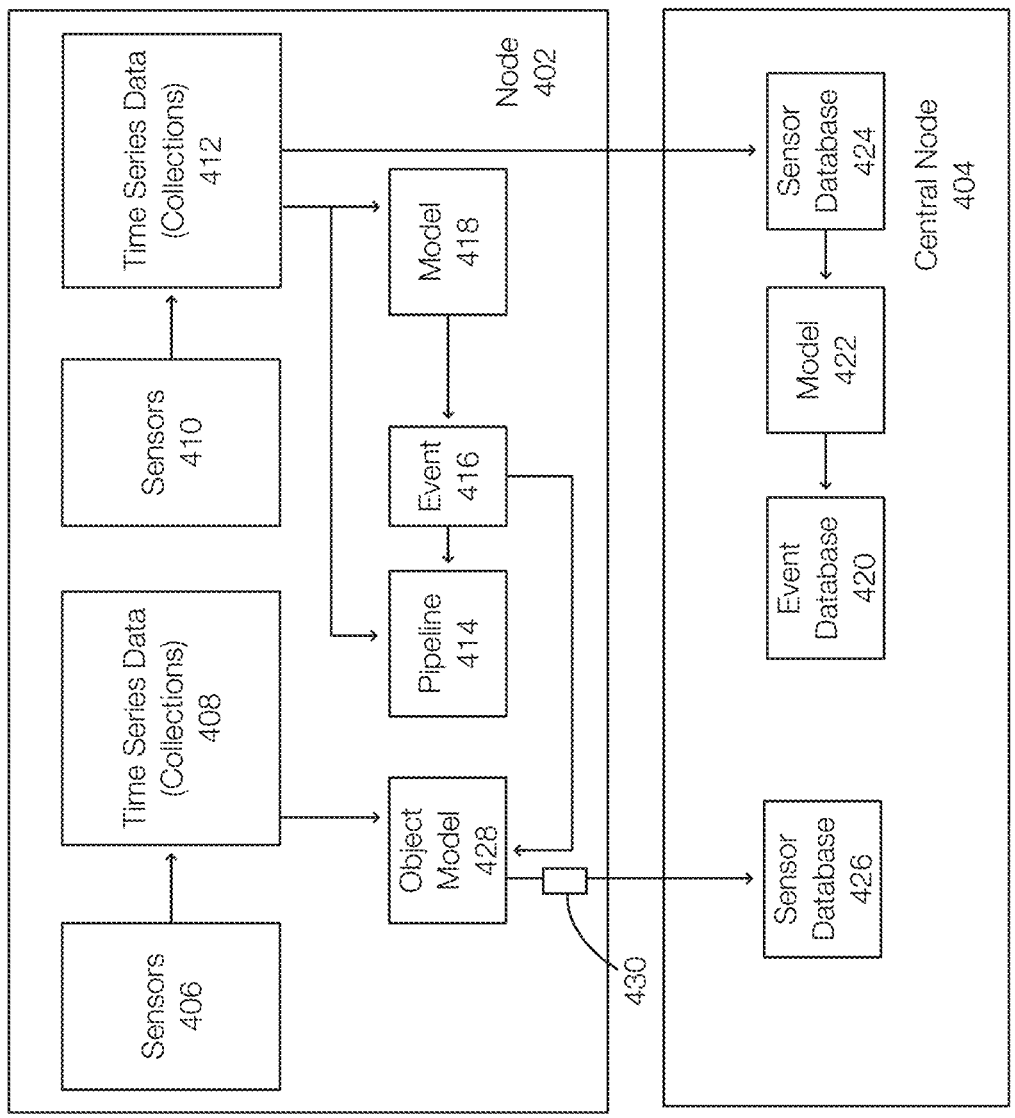
FIG. 4C discloses aspects of event-detection models that selectively used sensor-generated data.
Figure 4D:
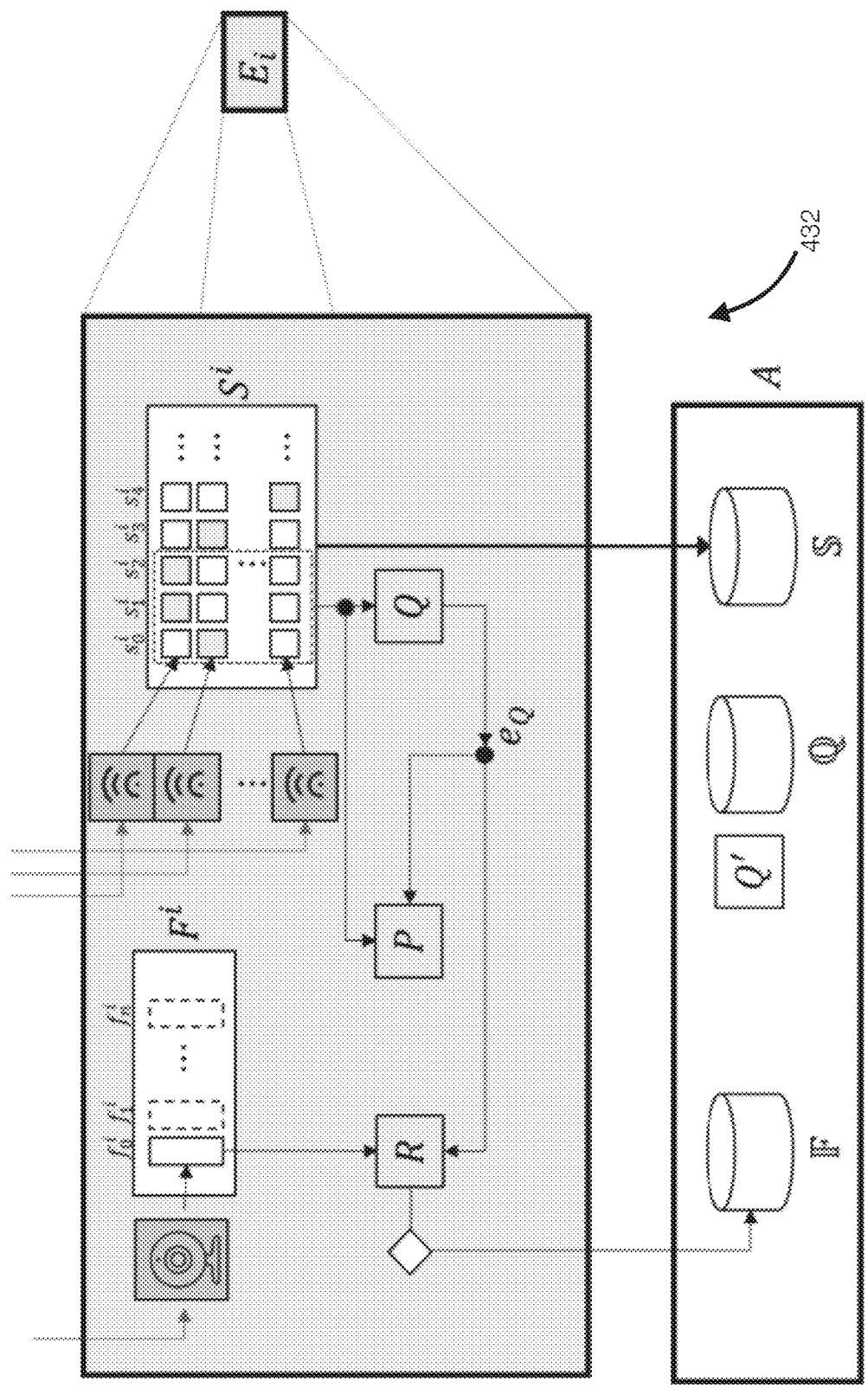
FIG. 4D discloses a representation of FIG. 4C that includes mathematical representations of models, data, and data sets.

FIG. 4C discloses aspects of detecting events in an environment in a manner that selectively considers video data, thereby avoiding some of the associated processing, transmission, and storage costs. FIG. 4D illustrates a mathematical representation 432 of the node in FIG. 4C. With reference to FIGS. 4C and 4D, FIG. 4C illustrates an object model 428 (R) that is configured to generate an objectness score r for data generated by the sensors 406. The model 428 may operate on individual video frames, multiple frames from a specific camera, or collections of frames from multiple cameras.

More specifically, the model 428 may compute cues using purpose specific processing methods in an image window and perform a Bayesian aggregation step to yield the objectness score. Example cues include, by way of example, color contrast, edge density, superpixel straddling, number of edges, or the like or combination thereof. In some examples, the model 428 may be trained using datasets of available images, using label information to derive indications of objects.

The model 428 is deployed to the nodes in the environment, such as the node 402 (e.g., node $E_i$). The objectness score r allows specific video frames to be selected, which includes video frames that are more likely to include an object associated with an event. The selected video frames 430 and/or the objectness score r may be provided to the sensor database 426 ($\mathbb{F}$) and/or to the pipeline 414. The event 416 allows the number of frames selected by the object model 428 to be reduced (e.g., compared to FIG. 4A) and thus reduces processing, transmission, and storage requirements in the sensor database 426.

In some examples, frames from the time series data 408 that do not have a threshold objectness score may be discarded. For example, the model 428 may evaluate each collection as the collection becomes available. Older collections that did not have a sufficient objectness score may be discarded, as illustrated by the dashed lines in the mathematical representation 432. As a result, the sensor database 426 may only store video data that satisfied a threshold objectness score.

In one example, the object model 428 ensures that the sensor database 426, over time, includes frames or data that can be used to train an object-driven event model. Further, the object-driven model can be trained at the central node 404. The object driven model can be trained as an alternative to the model 422 and can be distributed to the nodes in the environment. More generally, the pipeline 414 may make decisions based on the event 416, the objectness score or selected video frames 430, the time series data 412, or the like.

Figure 5:
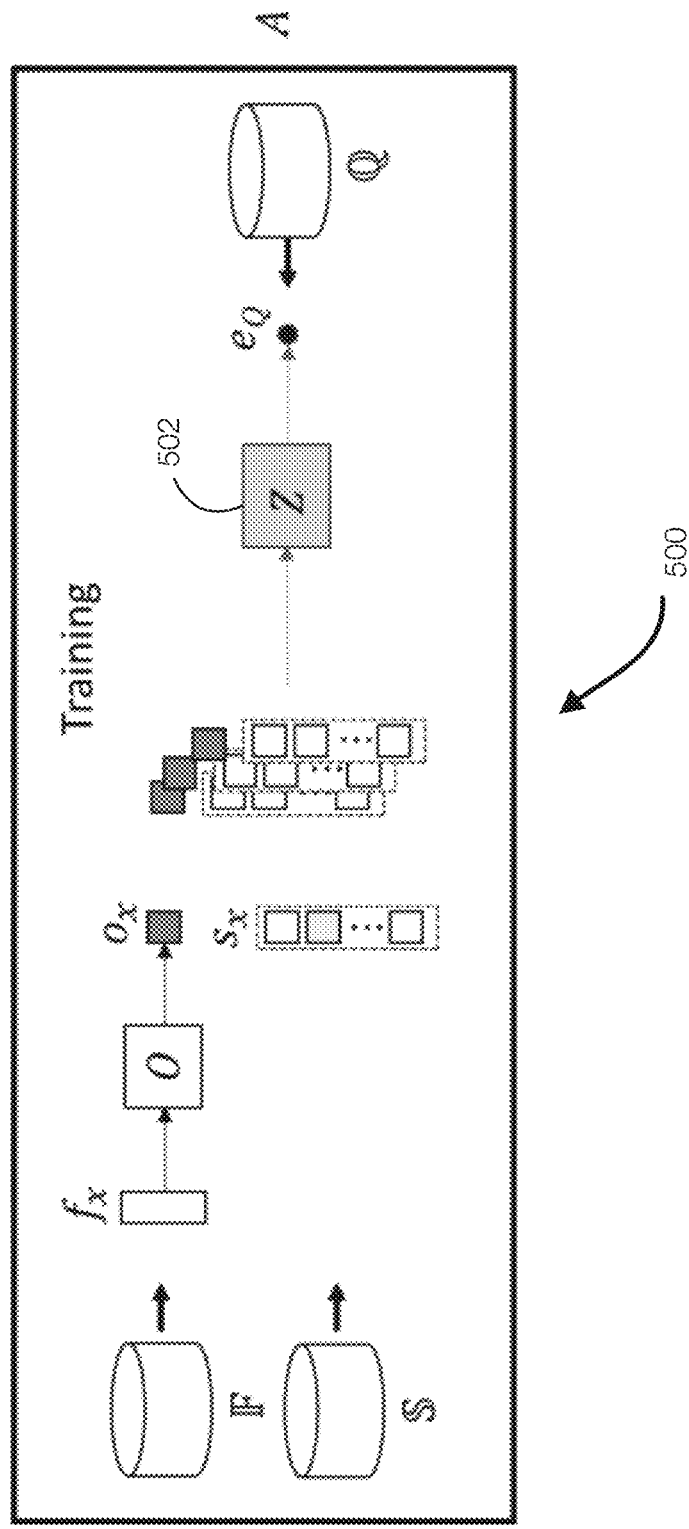
FIG. 5 discloses aspects of training an event detection models.

FIG. 5 discloses aspects of training an object-driven event model. With reference to FIGS. 4A-4D, the training 500 occurs at a central node A, such as the central node 404. In this example, the sensor databases $\mathbb{F}$ and $\mathbb{S}$ are used to train the model 502 (Z).

As previously stated, the model 422 (Q') is trained taking as input a collection $s \in \mathbb{S}$ in order to predict events $e_Q \in \mathbb{Q}$. Training 500 the model 502 uses the model O, which may be similar or identical to the model R deployed to the node 402. (e.g., the model 428). If the model O is not available, the model O can be trained. If it is necessary to train the model O, labels may be needed. The labels may include object labels or image level labels.

Thus, the model O outputs object indications $o_x$ from a frame $f_x$. Because the model O is identical to the model 428, the object indication $o_x$ is an object score that caused the frame $f_x$ to be selected for inclusion in the sensor database 426 ($\mathbb{F}$). If the model O is trained to provide object indications, the object indication $o_x$ may include the indication in addition to the objectness score. For example, the indication may indicate a type of object or the like.

The training data used to train the model 502 thus includes objectness scores, object indicators, and/or sensor data $s_x$ (e.g., a collection of the positional time series data) from the sensor database 424 ($\mathbb{S}$). If a frame for a specific collection $s_x$ is not available (e.g., the objectness score was below a threshold), the corresponding collection of positional sensor data may not be used for training 500 the model Z.

In one example, events $e_Q$ from event database 420 $\mathbb{Q}$ are available. This allows the training 500 to be supervised, particularly if additional vetting or labeling of the events $e_Q$ from event database 420 $\mathbb{Q}$ are available. In one example, the model 502 may be trained with respect to a single collection, which is supported by the object identification $o_x$ of a related frame. This allows decision-making to be supported at the node using only the most recent collection of the sensor data 410 ($s_0^i$). This allows older sensor data ($s_x^i$) to be discarded. However, the older sensor data may be retained in local storage of the node, at least temporarily, until transmitted to the central node 404. Frames from the sensors 406 may be discarded after used by the model 502.

Figure 6:
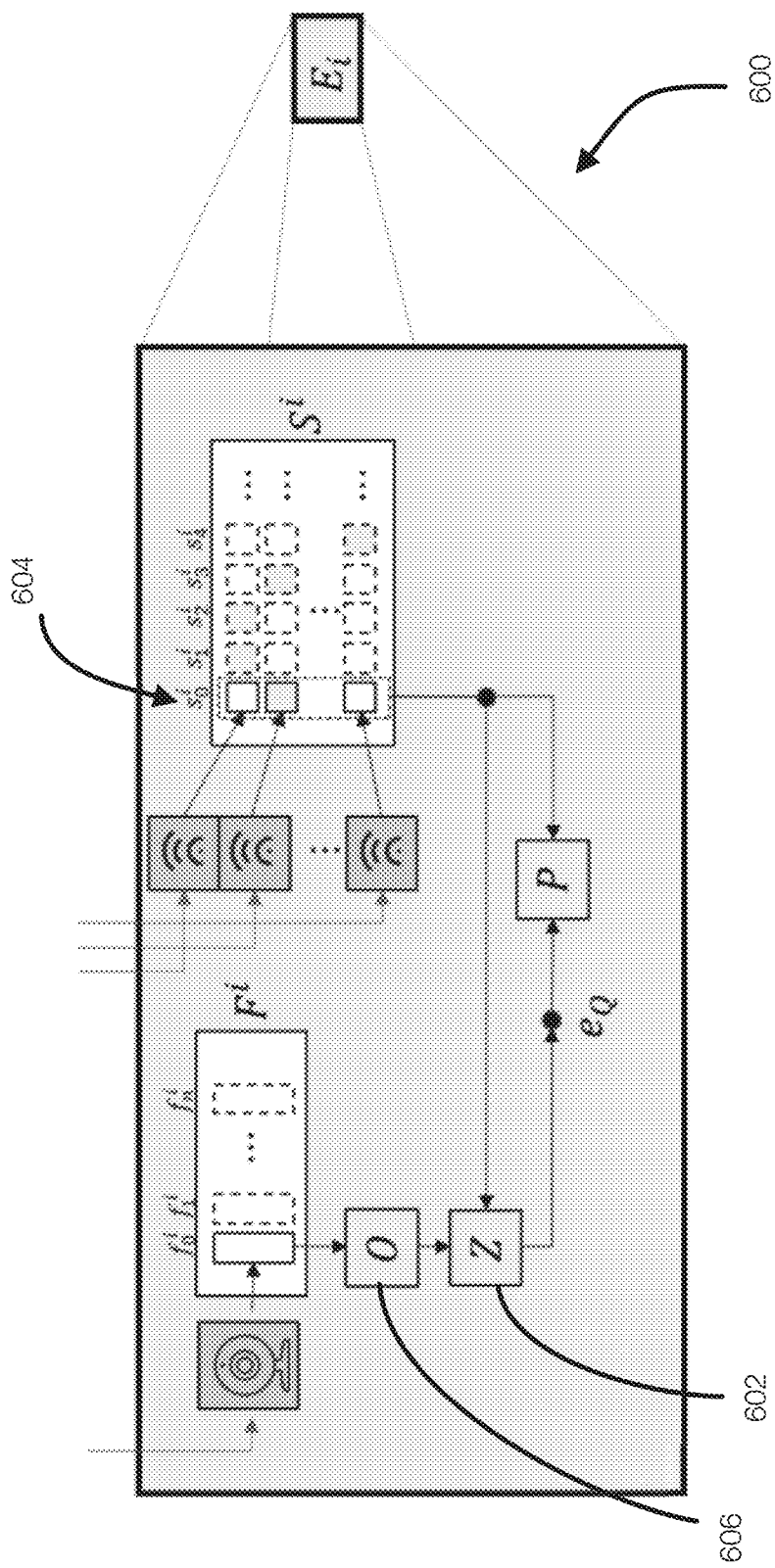
FIG. 6 discloses aspects of operating an event detection model using single collections of sensor data.

FIG. 6 discloses aspects of a model that supports decision-making at a node. In FIG. 6, a model 602 (an example of the model Z) has been deployed to the node 600. As illustrated, the model O generates an objectness score for a current collection of video data $f_0^i$. Older collections may be discarded. Similarly, input to the model 602 includes sensor data $s_0^i$, which corresponds to or is related to the video data $f_0^i$ and objectness score $O_0$. In particular, decision making is supported by an inference from the model 602 that relies on a single collection of sensor data 604 (the most recent frame or frame collection).

In one example, the model 606 (O) may be more than an objectness score model R as previously described. The model 606 may also be an object detection model. This may allow the object to be interpreted as specific events are raised and considered by the pipeline and/or the central node.

Embodiments of the invention allow processing, storage, and transmission costs to be reduced, while still generating and gathering sensor data continuously.

Embodiments of the invention relate a single most-recent data collection, coupled with an object indication and/or objectness score, to perform event detection at the edge (at each node) without waiting for multiple collections of sensor data. If the model 606 is a more robust object-detection model that allows interpretability, this may allow the presence/absence of objects to be identified and may be used in auditing and management operations.

Figure 7:
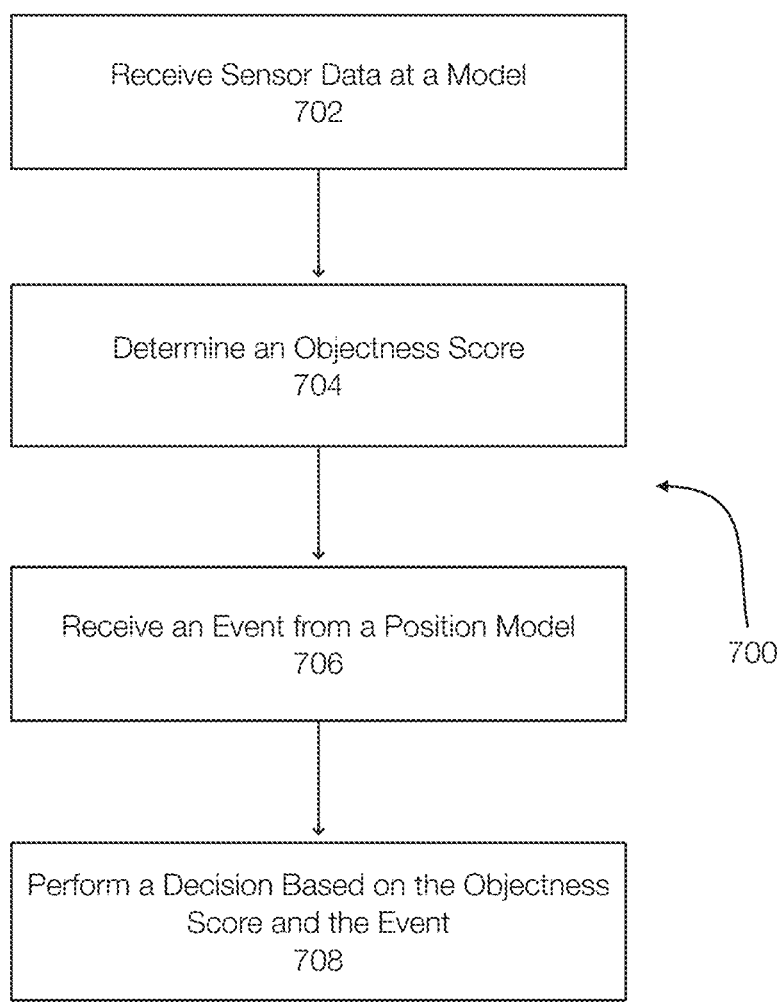
FIG. 7 discloses aspects of a method for event detection.

FIG. 7 discloses aspects of a method related to logistics operations. In the method 700, sensor data, such as video data, is received at a model, which generates or determines 704 an objectness score for the video data. More specifically, sensor data generated by cameras is processed by a video model or a model that has been trained to recognize objects in video data or in video frames. Each of the frames (or set of frames) may be scored by the model. Video data that receives an objectness score above a threshold score is saved locally at the mode at least until transmitted to a video sensor database at a central node.

A position model may also be operating on position data or on collections of position data. The position model may generate an event based on the position data. In one example, the position model considers the position of the node and/or positions of other nodes and/or the positions of hazards. When the position model detects an event (e.g., the node may collide with another node), the event is provided to a pipeline Thus, an event is received 706 from the position model.

In the method 700, the pipeline may receive an objectness score and/or an object indicator if the model is configured to recognize objects for video data that corresponds in time to position data that is associated with an event. The pipeline may make or perform 708 a decision is performed 708 based on the objectness score and/or the event. This may include generating an alarm, generating a notification for one or more users, notifying a building manager, shutting down equipment, or the like.

Advantageously, video data that does not have a sufficient threshold score is discarded and not stored.

In another example method, the model is configured to receive sensor data including both position data and video data. The model can then generate an event, which event drives decisions made by a pipeline.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, logistic operations.

New and/or modified data collected and/or generated in connection with some embodiments, may be stored in an environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, containers, or VMs, or any combination of these, though no particular device implementation or configuration is required for any embodiment.

As used herein, the term 'data' is intended to be broad in scope. Thus, that term embraces, by way of example and not limitation, video data, sensor data, data segments such as may be produced by data stream segmentation processes, data chunks, data blocks, atomic data, or the like.

Example embodiments of the invention are applicable to any system capable of storing and handling various types of objects, in analog, digital, or other form. Although terms such as file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited. Each of the Figures may disclose aspects of structure and methods.

Following are some further example embodiments of the invention. These are presented only by way of example and are not intended to limit the scope of the invention in any way.

Embodiment 1. A method, comprising: receiving video data and position data at a model operating on a node, determining an objectness score for the video data, generating an event, by the model, from the position data and the video data when the objectness score for the video data is above a threshold objectness score, and making a decision based on the event.

Embodiment 2. The method of embodiment 1, further comprising discarding video data that does not receive an objectness score above the threshold objectness score.

Embodiment 3. The method of embodiment 1 and/or 2, wherein the model uses a single collection of the position data when generating the event, wherein the single collection of the position data corresponds in time to the objectness score for the video data.

Embodiment 4. The method of embodiment 1, 2, and/or 3, further comprising deploying the model to multiple nodes in an environment including the node.

Embodiment 5. The method of embodiment 1, 2, 3, and/or 4, further comprising storing the video data whose objectness score is above a threshold in a video data sensor database at a central node, storing the position data generated at the node in a position sensor database at the central node, and storing the event in an event database at the central node.

Embodiment 6. The method of embodiment 1, 2, 3, 4, and/or 5, further comprising training the model, prior to deployment, using video data in the video sensor database and the position data in the position sensor database at the central node.

Embodiment 7. The method of embodiment 1, 2, 3, 4, 5, and/or 6, further comprising operating a model that corresponds to the model at the node.

Embodiment 8. The method of embodiment 1, 2, 3, 4, 5, 6, and/or 7, wherein the decision includes generating an alarm.

Embodiment 9. The method of embodiment 1, 2, 3, 4, 5, 6, 7, and/or 8, wherein the model is configured to generate an object indicator.

Embodiment 10. The method of embodiment 1, 2, 3, 4, 5, 6, 7, 8, and/or 9, further comprising training the model with labels associated with events in an event database at a central node.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 8:
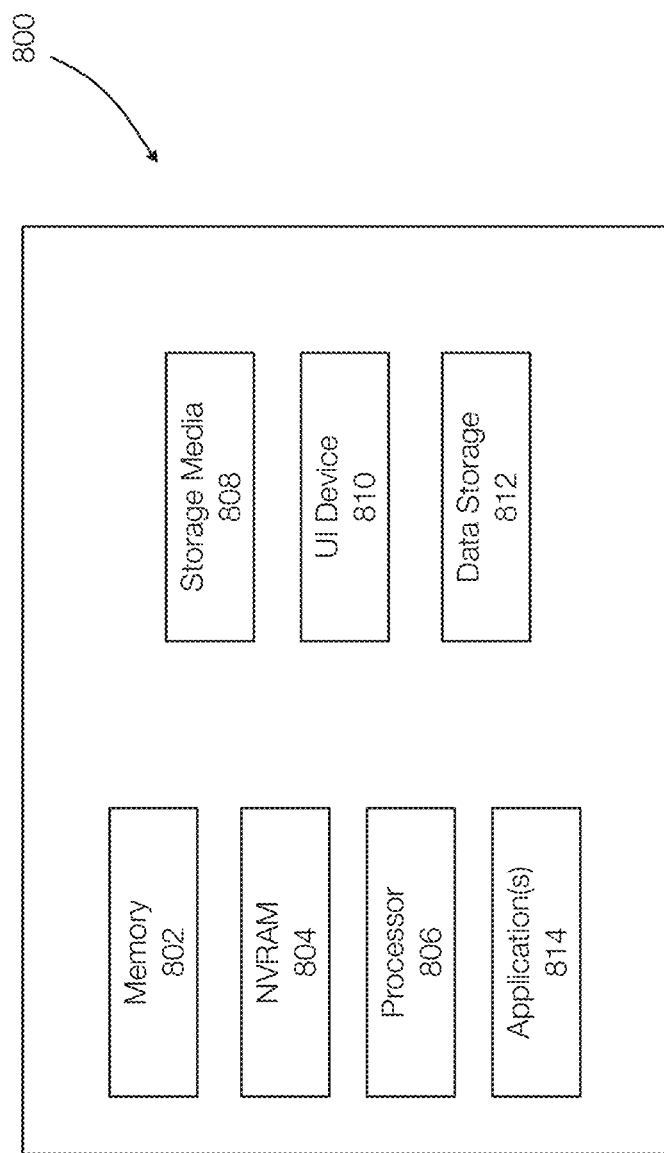
FIG. 8 discloses aspects of a computing device or a computing system.

With reference briefly now to FIG. 8, any one or more of the entities disclosed, or implied, by Figures and/or elsewhere herein, may take the form of, or include, or be implemented on, or hosted by, a physical computing device, one example of which is denoted at 800. As well, where any of the aforementioned elements comprise or consist of a virtual machine (VM), that VM may constitute a virtualization of any combination of the physical components disclosed in FIG. 8.

In the example of FIG. 8, the physical computing device 800 includes a memory 802 which may include one, some, or all, of random-access memory (RAM), non-volatile memory (NVM) 804 such as NVRAM for example, read-only memory (ROM), and persistent memory, one or more hardware processors 806, non-transitory storage media 808, UI device 810, and data storage 812. One or more of the memory components 802 of the physical computing device 800 may take the form of solid-state device (SSD) storage. As well, one or more applications 814 may be provided that comprise instructions executable by one or more hardware processors 806 to perform any of the operations, or portions thereof, disclosed herein. The device 800 may alternatively represent a computing system, a cloud or edge environment, a node, or the like or combination thereof.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
receiving position data at a first model operating on a node, wherein the first model is trained using a set of historical data that includes positional data and video data, wherein the node includes sensors configured to generate the position data at the node, the position data including time series data, wherein the position data determine a position of the node in an environment, a direction of node movement in the environment, an anticipated trajectory of the node, and a velocity of the node;

generating, by an object model, a set of cues from video data generated at the node or in the environment, wherein the set of cues includes information associated with the video data including one or more of color contrast, edge density, superpixel straddling, and number of edges, or combinations thereof;

determining, by the object model, an objectness score for the video data;

selecting first video frames from the video data that have objectness scores greater than a threshold objectness score and discarding second video frames from the video data that have objectness scores lower than the threshold objectness score;

generating an event, by a first model, based on a most recent position data and first video frames that correlate to the most recent position data;

providing the event to a pipeline;

making a decision by the pipeline based on the event generated by the first model;

performing the decision at the node and auditing the event based on the first video frames.

2. The method of claim 1, further comprising determining the objectness score using multiple models including the object model, wherein at least one of the multiple models is configured to detect objects in the video data.

3. The method of claim 1, wherein the first model uses a single collection of the position data when generating the event, wherein the single collection of the position data corresponds in time the first video frames.

4. The method of claim 1, further comprising deploying the object model and the first model to the multiple nodes in the environment including the node.

5. The method of claim 1, further comprising:
storing the video data whose objectness score is above the threshold objectness score in a video data sensor database at a central node;
storing the position data generated at the node in a position sensor database at the central node; and
storing the event in an event database at the central node.

6. The method of claim 5, further comprising training the first model, prior to deployment, using video data in the video sensor database and the position data in the position sensor database at the central node.

7. The method of claim 1, wherein the object model and/or the first model operate at the node or at a central node.

8. The method of claim 1, wherein the decision includes generating an alarm.

9. The method of claim 1, wherein the object model is configured to generate an object indicator, wherein the position data includes position data from multiple objects.

10. The method of claim 9, further comprising training the first model with labels associated with events in an event database at a central node.

11. A non-transitory storage medium having stored therein instructions that are executable by one or more hardware processors to perform operations comprising:
receiving position data at a first model operating on a node, wherein the first model is trained using a set of historical data that includes positional data and video data, wherein the node includes sensors configured to generate the position data at the node, the position data including time series data, wherein the position data determine a position of the node in an environment, a direction of node movement in the environment, an anticipated trajectory of the node, and a velocity of the node;

generating, by an object model, a set of cues from video data generated at the node or in the environment, wherein the set of cues includes information associated with the video data including one or more of color contrast, edge density, superpixel straddling, and number of edges, or combinations thereof;

determining, by the object model, an objectness score for the video data;

selecting first video frames from the video data that have objectness scores greater than a threshold objectness score and discarding second video frames from the video data that have objectness scores lower than the threshold objectness score;

generating an event, by a first model, based on a most recent position data and first video frames that correlate to the most recent position data;

providing the event to a pipeline;

making a decision by the pipeline based on the event generated by the first model;

performing the decision at the node and auditing the event based on the first video frames.

12. The non-transitory storage medium of claim 11, further comprising determining the objectness score using multiple models including the object model, wherein at least one of the multiple models is configured to detect objects in the video data.

13. The non-transitory storage medium of claim 11, wherein the first model uses a single collection of the position data when generating the event, wherein the single collection of the position data corresponds in time the first video frames.

14. The non-transitory storage medium of claim 11, further comprising deploying the object model and the first model to the multiple nodes in the environment including the node.

15. The non-transitory storage medium of claim 11, further comprising:
storing the video data whose objectness score is above the threshold objectness score in a video data sensor database at a central node;
storing the position data generated at the node in a position sensor database at the central node; and
storing the event in an event database at the central node.

16. The non-transitory storage medium of claim 15, further comprising training the first model, prior to deployment, using video data in the video sensor database and the position data in the position sensor database at the central node.

17. The non-transitory storage medium of claim 11, wherein the object model and/or the first model operate at the node or at a central node.

18. The non-transitory storage medium of claim 11, wherein the decision includes generating an alarm.

19. The non-transitory storage medium of claim 11, wherein the object model is configured to generate an object indicator, wherein the position data includes position data from multiple objects.

20. The non-transitory storage medium of claim 19, further comprising training the first model with labels associated with events in an event database at a central node.

* * * * *